(12) United States Patent
Burgess et al.

(10) Patent No.: US 7,818,534 B2
(45) Date of Patent: Oct. 19, 2010

(54) DETERMINATION OF SAMPLING CHARACTERISTICS BASED ON AVAILABLE MEMORY

(75) Inventors: David A. Burgess, Menlo Park, CA (US); Amit Umesh Shanbhag, San Francisco, CA (US); Brian T. Selle, Heath, TX (US); Glen Anthony Ames, Mountain View, CA (US); Sundara Raman Rajagopalan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 133 days.

(21) Appl. No.: 11/746,541

(22) Filed: May 9, 2007

(65) Prior Publication Data

US 2008/0282020 A1 Nov. 13, 2008

(51) Int. Cl.
*G06F 17/30* (2006.01)
(52) U.S. Cl. ...................... 711/172; 707/720
(58) Field of Classification Search .......... 711/171, 711/172; 707/270
See application file for complete search history.

(56) References Cited

U.S. PATENT DOCUMENTS

| | | | | |
|---|---|---|---|---|
| 6,122,616 | A * | 9/2000 | Henton | 704/258 |
| 6,247,076 | B1 * | 6/2001 | Ono | 710/65 |
| 6,873,600 | B1 * | 3/2005 | Duffield et al. | 370/252 |
| 7,028,022 | B1 * | 4/2006 | Lightstone et al. | 707/2 |
| 2003/0083040 | A1 * | 5/2003 | Ruth et al. | 455/405 |
| 2003/0103615 | A1 * | 6/2003 | Baltes | 379/245 |
| 2004/0205043 | A1 * | 10/2004 | Alessi et al. | 707/2 |
| 2005/0270985 | A1 * | 12/2005 | Hao et al. | 370/252 |

FOREIGN PATENT DOCUMENTS

WO    WO 2005104436 A1 * 11/2005

OTHER PUBLICATIONS

Jermaine, Christopher, Abhijit Pol, and Subramanian Arumugam. "Online Maintenance of Very Large Random Samples." Jun. 2004. SIGMOD 2004. ACM.*

(Continued)

*Primary Examiner*—Reginald G Bragdon
*Assistant Examiner*—Nathan Sadler
(74) *Attorney, Agent, or Firm*—Weaver Austin Villeneuve and Sampson LLP (57) ABSTRACT

A portion of data records of a full input data set are imported into memory of a computer system for processing by an executing application. The full input data set includes data records of a dimensionally-modeled fact collection. An amount of the data of the full input set to import is determined based on an amount of available memory of the computer system. The sampling characteristics for sampling the full input data set are determined based on the amount of the data that can be imported and on characteristics of the full input data set and application involved. The full input data set is then sampled and a portion of the records are imported into the memory of the computer system for processing. The sampling characteristics are determined such that analysis as a result of processing by the executing application of the sampled portion of the records imported is representative of the analysis that could otherwise be carried out on the full input data set, with a calculable statistical relevance.

17 Claims, 4 Drawing Sheets

OTHER PUBLICATIONS

Brown, Paul G. and Peter J. Haas. "Techniques for Warehousing of Sample Data." Apr. 2006. ICDE 2006. IEEE.*

Gibbons, Phillip B., Yossi Matias, and Viswanath Poosala. "Aqua Project White Paper." Dec. 30, 1997. Bell Laboratories. http://www.pittsburgh.intel-research.net/people/gibbons/papers/aqua_whitepaper.pdf.*

Noll, Landon Curt. "Fowler / Noll / Vo (FNV) Hash." Dec. 17, 2001. http://www.isthe.com/chongo/tech/comp/fnv/.*

Hou, Wen-Chi; Gultekin Ozsoyoglu; and Baldeo K. Taneja. "Statistical Estimators for Relational Algebra Expressions." ACM. PODS '88.*

Bin Chen, Peter Haas, and Peter Scheuermann. "A New Two-Phase Sampling Based Algorithm for Discovering Association Rules." 2002. ACM. SIGKDD '02.*

Neville Hunt and Sidney Tyrrell. "Stratified Sampling." Jun. 2004. http://www.coventry.ac.uk/ec/~nhunt/meths/strati.html.*

Albert Benveniste and Gerard Berry. "The Synchronous Approach to Reactive and Real-Time Systems." Sep. 1991. IEEE. Proceedings of the IEEE. vol. 79. No. 9. pp. 1270-1282.*

* cited by examiner

DETERMINATION OF SAMPLING CHARACTERISTICS BASED ON AVAILABLE MEMORY

BACKGROUND

It is common to analyze large data sets in the process of making business decisions. Such data sets may be thought of as comprising a dimensionally-modeled fact collection. For example, each "record" of the fact collection may represent attributes of an "entity" or "item" such as a particular user of online services, whereas the value in each field of the record represents a value of a particular characteristic of that entity (e.g., age of user, gender of user, number of online page views by that user, etc.). While the term "record" is used, this is not meant to imply any particular organization of the dimensionally-modeled fact collection (e.g., such that the fact collection is organized as a relational database, etc.).

Figure 1:
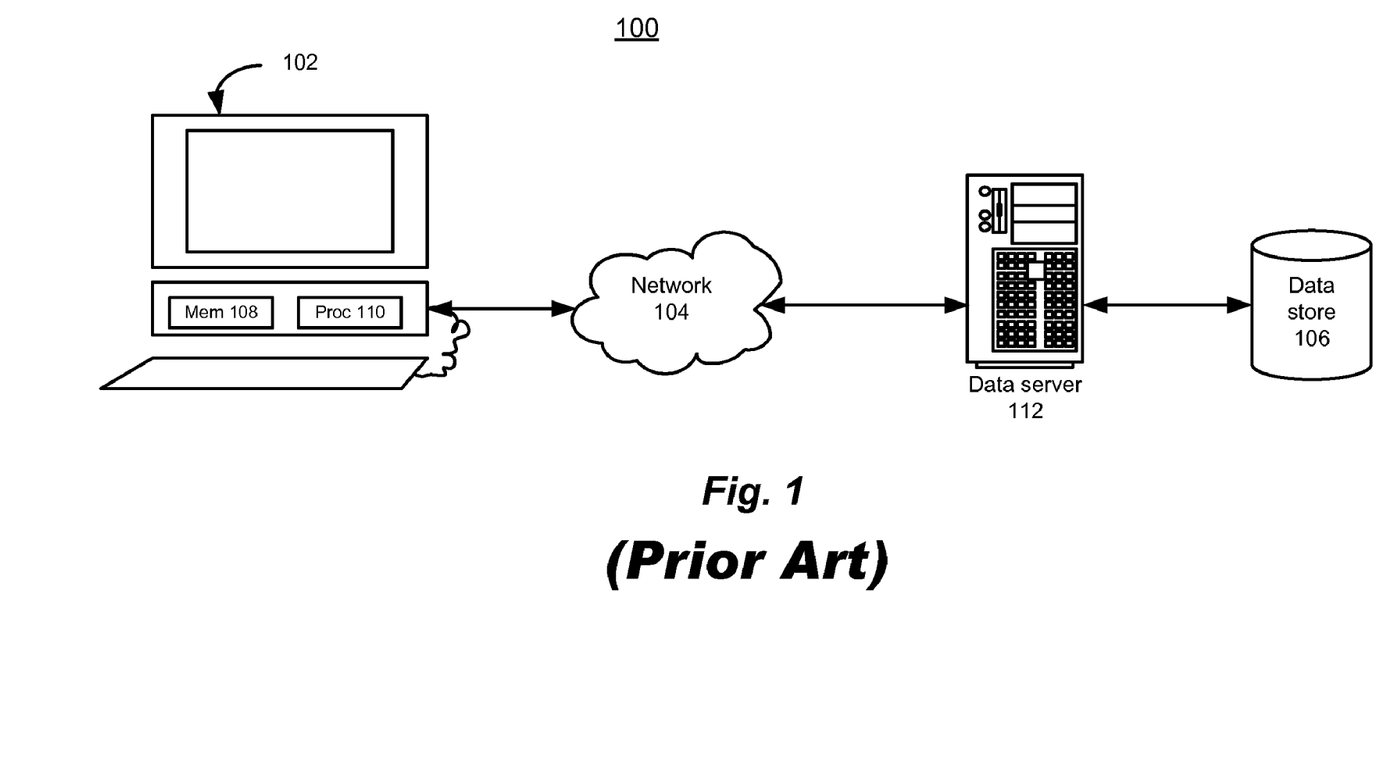
FIG. 1 illustrates a system in which a computing device is connectable via a network to a server, the server being configured to interoperate with the computing device to load data of a data set, for analysis, into the memory of the computing device.

In many situations, the data of a data set resides in a persistant storage device, such as a file system, data warehouse or database. The data of the data set is loaded into the memory of a computer system in order to process the data using an analysis application being executed by the computer system. For example, FIG. 1 illustrates a system 100 in which a computing device 102 is connectable via a network 104 to a server 112. An application being executed by the computing device system (e.g., by a processor or processor system 110) may interoperate with the server 112 to cause data to be imported from a data store 106 into memory 108 of the computing device to be processed. The data store 106 may be directly connected to the network 104 (e.g., a SAN device) or directly attached to the computing device (such as a hard drive of a personal computer).

An example of an analysis application includes an application to visually explore the data. If the data set is too large to fit in the available space of the memory, the application may fail due to memory availability restrictions. The failure may become apparent only after a long attempt import process. In some other cases, as the analysis application executes, the data may be swapped into and out of memory from a slower storage, such as from a disc, and as a result, the application may perform poorly.

SUMMARY

In accordance with an aspect of the invention, a portion of data records of a full input data set are imported into memory of a computer system for processing by an executing application. The full input data set includes data records of a dimensionally-modeled fact collection. An amount of the data of the full input set to import is determined based on an amount of available memory of the computer system. Based on the determined amount of the data to import and on characteristics of the full input data set at least other than the total size of the full input data set, sampling characteristics for sampling the full input data set are determined. A portion of the records of the full input data set are caused to be imported into the memory of the computer system, including sampling the full input data set, to determine the portion of the records to import, in accordance with the determined sampling characteristics.

The executing application may be, for example, for analysis of the data set, such as a data visualization application. For example, each data record may include information regarding behavior of a particular entity (e.g., a user, account or application) with respect to online services. Sampling the full input data set, to determine the portion of the records to import, may then include sampling such that, for each record of the full input data set sampled, wherein that input record has information about a particular entity, every record of the full input data set including information regarding behavior of the particular entity is sampled.

An indication of the statistical significance of the analysis results, based on the sampling, may be provided. For example, the indication of the statistical significance may in the form of a confidence interval, an error margin, etc.

DETAILED DESCRIPTION

In accordance with an aspect of the invention, it is determined a portion of the full input data set to input based on an amount of available memory of a computer system. The full input data set is sampled such that the sampled portion is input, and analysis on the sampled portion provides statistically relevant results such that the analysis is representative of the analysis that could otherwise be carried out on the full input data set.

Figure 2:
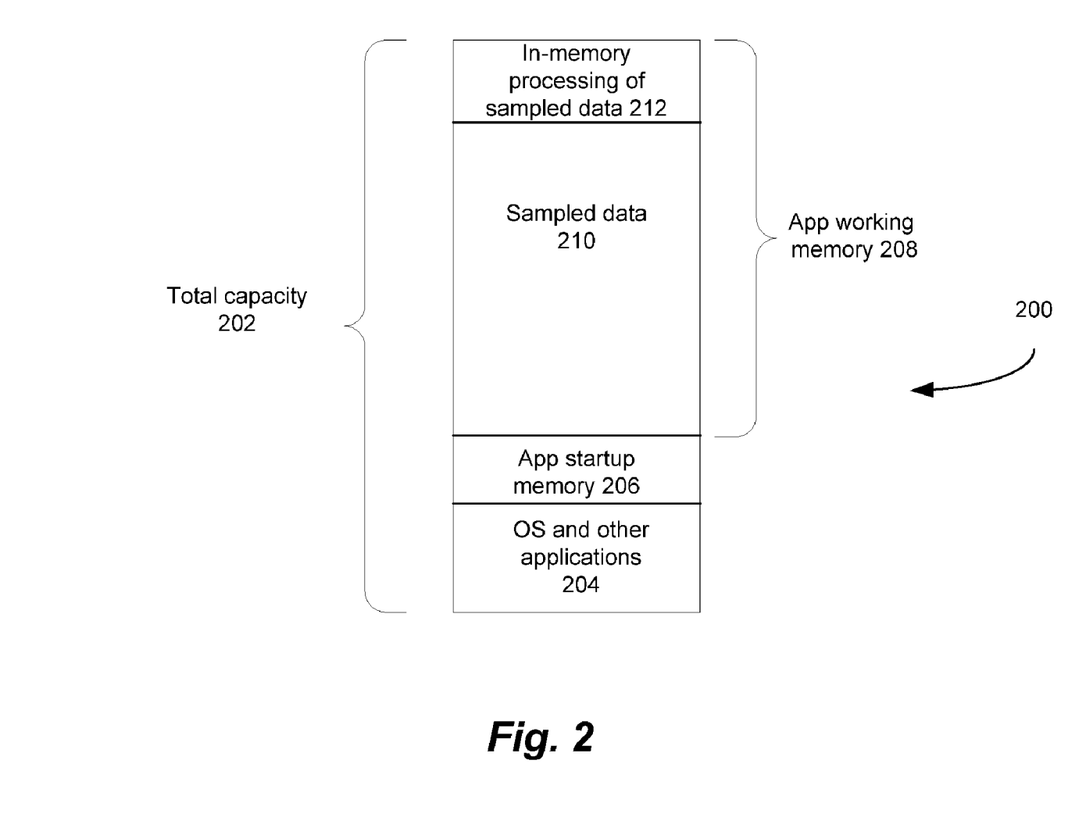
FIG. 2 schematically illustrates an example organization of memory of a computing device configured to execute an analysis application.

FIG. 2 schematically illustrates an example organization of memory 200 of a computing device (such as of the memory 108 of the computing device 102 in FIG. 1) configured to execute an analysis application. The memory has a total capacity 202. A portion 204 of the capacity 202 is used or otherwise reserved by the operating system of the computing device and/or for applications other than the analysis application. Another portion 206 of the capacity 202 is used for startup of the analysis application. A remaining portion 208 of the capacity 202 is working memory for the application (typically, for the application to operate with good performance, though the application could operate with more memory with degraded performance), including available space 210 for sampled data that is a portion of a full input data set, as well as available space 212 for in-memory processing of the sampled data by the analysis application.

We now discuss an example of processing to determine a sampled portion to input for analysis that is a portion of a full input data set. That is, the full input data set does not fit into the available space 210 for sampled data. The inventors have recognized that there are known sampling algorithms exhibiting a property such that analysis on the sampled portion provides statistically relevant results, so the analysis is representative of the analysis that could otherwise be carried out on the full input data set, with a calculable statistical relevance. This is in contrast to sampling schemes which may include, for example, merely using the first N records in a file or use the most recent N records placed in the file, in such a manner that the statistical relevance of an analytical result using the sampled data cannot be determined relative to the analytical result that would be obtained using the full input data set.

In one example, a Fowler/Noll/Vo (FNV) Hash algorithm is employed. A useful property of the FNV Hash algorithm is that it deterministically maps strings to integers. Thus, for example, where a particular field of records of the input full input data set is indicative of a "user id" value, the FNV Hash algorithm may be employed to map the user id values to a limited number of integers (which, according to the FNV Hash algorithm, are positive integers). For example, where the FNV Hash algorithm is applied to the values of a particular field generically referred to as key x, each unique value is always mapped to the same integer. Thus, in a specific example where the records represent user behavior with respect to online services, and the particular field is a user id, then all records for a particular user id are always mapped to the same integer.

Figure 3:
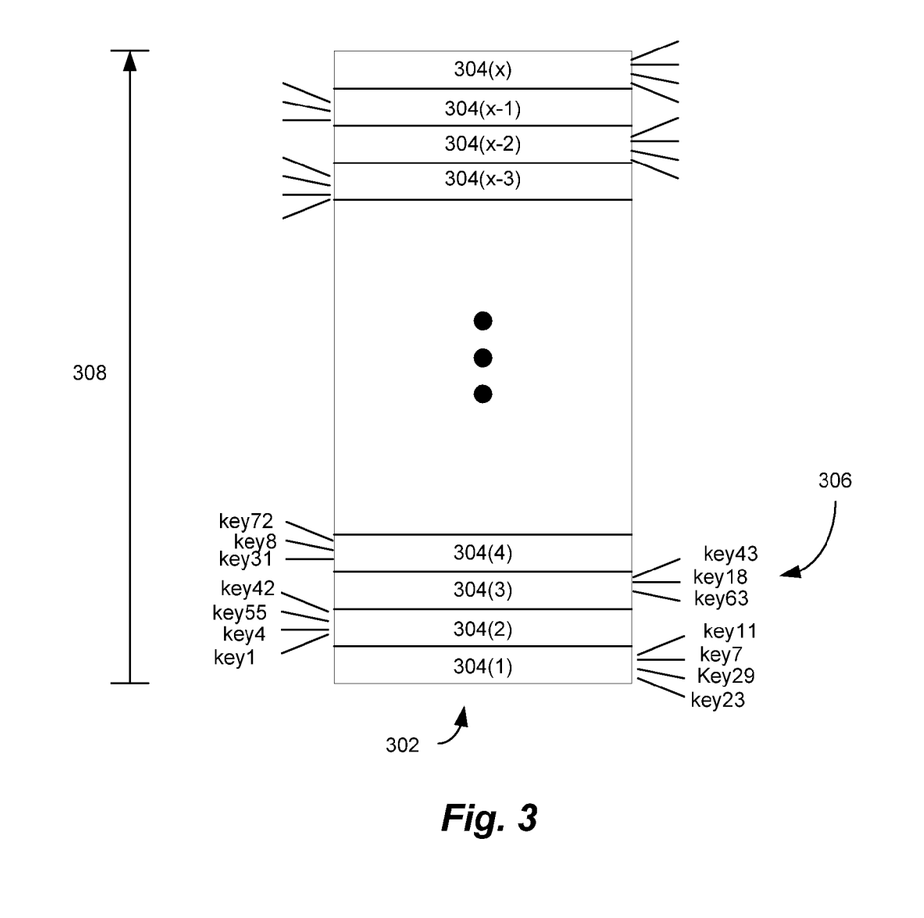
FIG. 3 schematically illustrates how various records of a full input data set may be mapped to a hypothetical memory, where the hypothetical memory has capacity to hold the entire full input data set.

FIG. 3 schematically illustrates, then, how various records of a full input data set may be mapped to a hypothetical memory 302, where the hypothetical memory 302 has capacity to hold the entire full input data set. Referring to FIG. 3, the hypothetical memory 302 includes a plurality of portions (i.e., 304(1), 304(2), 304(3) etc., to 304(x)), each portion corresponding to an integer 306 to which an FNV Hash algorithm may map key values 306 of records of the full input data set. In the FIG. 3 example, the portion 304(1) has mapped to it records having a key value of key11, key7, key29 and key23. The portion 304(2) has mapped to it records having a key value of key42, key55, key4 and key1. Other portions similarly have records mapped to them having particular key values.

As represented by the arrow 308, the tip of which may be moved up or down depending on an amount of the full input data set it is determined to sample to input for analysis, this mapping determines which portions of the hypothetical memory 302 from which to sample records to input for analysis. As a simplistic example, if there are ten portions 304 to which the FNV Hash algorithm may map key values of records of the full input data set, and it is determined that the available space for sampled data is equal to 90% of the full input data set, then the tip of the arrow 308 may be conceptually moved down one portion, such that the arrow 308 corresponds to only nine of the portions. For example, the FNV Hash algorithm and conceptual adjustment of the arrow 308 may be carried out in the data server 112 of the FIG. 1 system. As another simplistic example, again assuming there are ten portions 304 to which the FNV Hash algorithm may map key values of records of the full input data set, when it is determined that the available space for sampled data is equal to 40% of the full input data set, then the tip of the arrow 308 may be conceptually moved down six portions, such that the arrow 308 corresponds to only four of the portions.

Based on empirical experience, it has been determined that, in many instances, acceptably accurate results (i.e., within an acceptable confidence level) may be achieved by analyzing a sample of as little as 10% of the full input data set. Thus, even the available space for sampled data may merely provide an upper bound, and it may be desirable to sample even less than the available capacity, as processing less sampled data can save resources including time and CPU resources.

Figure 4:
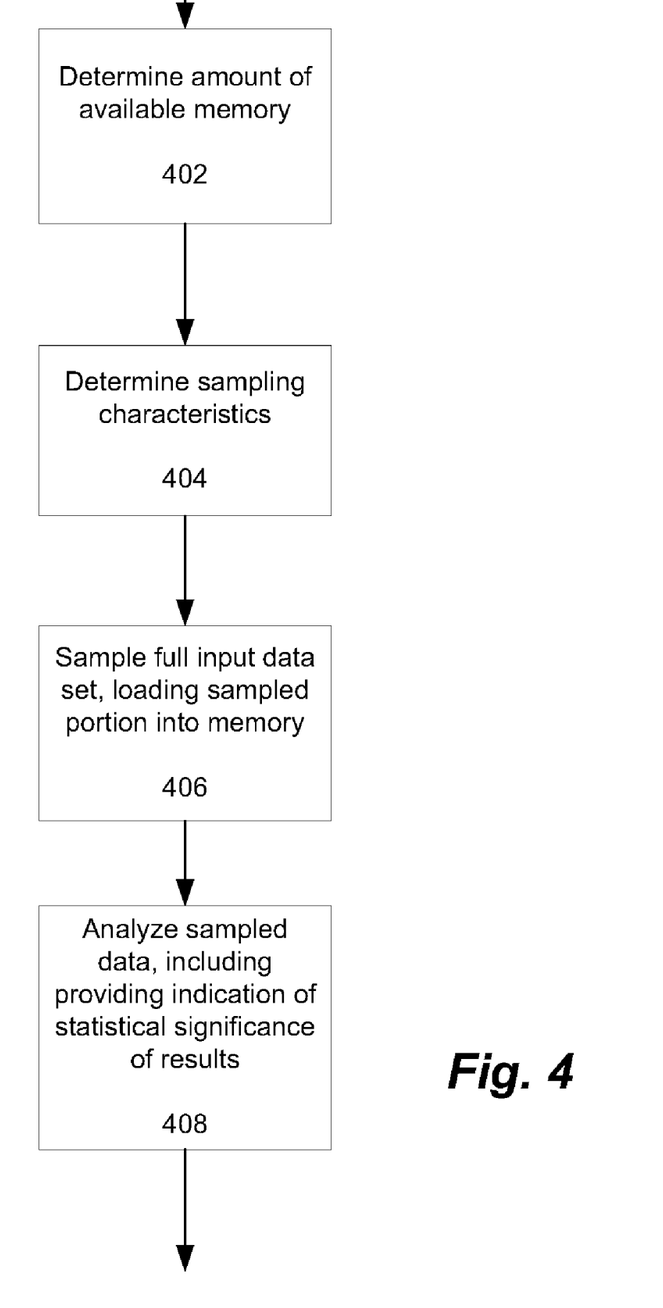
FIG. 4 is a flowchart illustrating processing that includes analyzing a sampled portion of a full input data set, based on a determined amount of available memory space to input sampled data of the full input data set.

Now, with reference to FIG. 4, we discuss processing to analyze a sampled portion of a full input data set. At step 402, it is determined an amount of available memory space to input sampled data of the full input data set. In some examples, the determination is based on an amount indication input by a user, or a system or application configuration. For example, the input amount indication may be a user-calculated and/or determined indication, or it may be a base amount from which, upon further processing, an amount of available memory space to input sampled data can be determined. That is, referring to the FIG. 2 example, the user may input, for example, an indication of the total capacity 202, may indicate an indication of the sampled data capacity 210 directly, or may input some other indication from which the sampled data capacity 210 may be determined. In any case, if an indication of the sampled data capacity 210 is not provided directly, then the sampled data capacity 210 should be derivable by knowing and/or estimating values for the other memory parameters.

At step 404, characteristics of the sampling are determined, based on the determined amount of available memory space to input sampled data of the full input data set. For example, it may be determined that the available memory space is 43% of the memory size of the full input data set and, based on an FNV Hash of the full input data into ten portions, then four portions of the hashed full input data set are to be sampled (i.e., rounding down from 43% to 40%, which is four portions).

In some examples, the characteristics of the sampling are determined, in part, based on characteristics of the full input data set, such as an average record size in memory and, in some examples, even an indication of how many records have values for the particular entity characteristics. This information may be used to more accurately characterize the sampling with respect to the available memory space.

At step 406, the full input data set is sampled according to the determined sampling characteristics, and the sampled portion of the full input data set is loaded into the available memory space of a computing device. In one example, a data server and the computing device into whose memory the sampled input data is loaded interoperate by packetizing (on the data server side) and depacketizing (on the computing device side) the sampled portion of the full input data, such as by blocks of records, in order to increase the import efficiency (e.g., by reducing overhead associated with importing data on a record by record basis).

At step 408, the sampled data is analyzed and/or visualized, including providing an indication of the statistical significance of the analysis results, based on the sampling. For example, the indication of the statistical significance may in the form of a confidence interval, an error margin, etc. Step 408 may be repeated, with the same or different analysis of the sampled data.

In some examples, an indication of user-provided desired statistical significance (e.g., higher confidence level, lower error margin, etc) may be processed and, based thereon, the sampling methodology and/or sampling rate adjusted. That is, a user may be presented an indication of a particular statistical significance that would be achieved with sampling characteristics determined based on an amount of available memory space to input sampled data of the full input data set. The user may indicate a desired statistical significance that is different from the particular statistical significance that would be achieved.

The amount of sampled data required to achieve the desired statistical significance may be greater than the determined amount of available memory space to input sampled data of the full input data set. Thus, to achieve such a user-provided desired statistical significance, the determined sampling characteristics are accordingly adjusted, including accounting for a process of swapping data into and out of the available memory space. The data is sampled and imported according to the adjusted sampling characteristics, including swapping data into and out of the available memory space, and the imported data is analyzed. In some examples, the sampling and import (including swapping) is a result of interoperation between a data server and the computing device into whose memory the sampled input data is loaded.

In other examples, the amount of sampled data required to achieve the desired statistical significance may be less than the determined amount of available memory space to input sampled data of the full input data set. As a result, the sampling characteristics may be accordingly adjusted to cause fewer records to be imported, and the data is sampled and imported according to the adjusted sampling characteristics.

We have thus described addressing the issue of inputting data into memory of a computer system for processing such that the input data may be sampled to fit into an amount of available memory. The processing to determine an amount of data to import, to determine sampling characteristics, etc. may be carried out on the computer with which the memory is associated, on a data loader server, or otherwise. For example, the processing may be carried out by such computer(s) under programmed control (e.g., the programs are stored in a tangible storage media).

What is claimed is:

1. A computer-implemented method comprising:
    importing a portion of a full input data set into memory accessible by one or more computing devices for processing by an executing application, wherein the full input data set comprises a plurality of data records representing a dimensionally-modeled fact collection and wherein each record comprises a plurality of characteristics of an entity, the importing of the portion of the full input data set comprising:
        determining an amount of the data of the full input data set to import based on an amount of available memory accessible to the one or more computing devices;
        based on the determined amount of the data to import and on characteristics of the full input data set other than the total size of the full input data set, determining sampling characteristics for sampling the full input data set to sample less than every record of the full input set,
        wherein the determined sampling characteristics are determined in part based on an indication of how many of the records have one or more particular values for one or more particular entity characteristics such that if a determined statistical significance achievable using the determined sampling characteristics does not meet a user-provided desired statistical significance for records with the particular values for the particular entity characteristics, the determined sampling characteristics are adjusted to meet the user-provided desired statistical significance for such records; and
        causing the portion of the full input data set to be imported into the memory of the computer system, including sampling the full input data set, to determine the portion of the records to import, in accordance with the determined sampling characteristics,
        wherein the adjusted sampling characteristics are such that analysis as a result of processing by the executing application of the sampled portion of the full input data set is representative of the analysis that could otherwise be carried out on the full input data set, with a calculable statistical relevance,
        wherein sampling the full input data set using the adjusted sampling characteristics is performed in a deterministic manner such that records of the full input data set having the particular values for the particular entity characteristics are included in the sampled portion of the full input data set in an amount sufficient to meet the user-provided desired statistical significance for such records, and
        wherein sampling the full input data set to determine the portion of the records to import includes applying a hash algorithm for sampling based on a key that is the value for each record at a particular dimension, the dimension in question being one that identifies a particular entity or user, wherein remaining information in each data record includes information regarding behavior or traits of the particular entity or user identified by the key for that record.

2. The computer-implemented method of claim 1, wherein:
    sampling the full input data set, to determine the portion of the records to import, includes sampling such that, for each record of the full input data set sampled, wherein that input record has information about a particular entity, every record of the full input data set including information regarding behavior of the particular entity is sampled.

3. The computer-implemented method of claim 1, further comprising:
    analyzing the sampled data records, including determining a statistical confidence for the analysis; and
    causing a result of the analysis, including the determined statistical confidence, to be made available to a user.

4. The computer-implemented method of claim 1, wherein:
    determining an amount of the data of the full input set to import based on an amount of available memory of the computer system includes determining the amount of the data in memory to be less than the amount of available memory of the computer system.

5. The computer-implemented method of claim 1, wherein:
    sampling the full input data set, to determine the portion of the records to import, includes
        assigning the full input data set into a plurality of bins, wherein for each record of the full input data set sampled, that input record has a particular value at a particular dimension and every record of the full input data set having the particular value at the particular dimension is in that same bin; and
        sampling all the records of at least one of the bins.

6. A computer-implemented method comprising:
    importing a portion of a full input data set into memory accessible by one or more computing devices for processing by an executing application, wherein the full input data set comprises a plurality of data records representing a dimensionally-modeled fact collection and wherein each record comprises a plurality of characteristics of an entity, the importing of the portion of the full input data set comprising:
        determining a nominal amount of the data of the full input set to import based on an amount of available memory accessible to the one or more computing devices;
        based on the determined amount of the data to import and on characteristics of the full input data set other than the total size of the full input data set, determining sampling characteristics for sampling the full input data set;
        determining a characteristic associated with the determined amount of data, the characteristic relating to how many of the records have one or more particular values for one or more particular entity characteristics;
        causing the computing device to adjust the determined sampling characteristics when a user-provided desired statistical significance for records having the particular values for the particular entity characteristics is not met by the determined characteristic associated with the determined amount of data; and causing the portion of the full input data set to be imported into the memory of the computer system, including sampling the full input data set, to determine the portion of the records to import, in accordance with the adjusted sampling characteristics, wherein sampling the full input data set using the adjusted sampling characteristics is performed in a deterministic manner such that records of the full input data set having the particular values for the particular entity characteristics are included in the sampled portion of the full input data set in an amount sufficient to meet the user-provided desired statistical significance for such records, and wherein sampling the full input data set to determine the portion of the records to import includes applying a hash algorithm for sampling based on a key that is the value for each record at a particular dimension, the dimension in question being one that identifies a particular entity or user, wherein remaining information in each data record includes information regarding behavior or traits of the particular entity or user identified by the key for that record.

7. The computer-implemented method of claim 6, wherein:
the adjusted sampling characteristics include characteristics corresponding to inputting the portion of records a sub-portion at a time, wherein analysis is carried out on the imported sub-portions while the others of the sub-portions are not present in the memory.

8. The computer-implemented method of claim 6, wherein:
the adjusted sampling characteristics include characteristics corresponding to inputting less than the determined nominal amount of the full input data set.

9. The computer-implemented method of claim 6, wherein:
the determined characteristic associated with the determined amount of data includes at least one of the group consisting of
  statistical confidence for analysis that would be achievable if carried out based on the determined amount of data;
  an amount of time to import the determined amount of data; and
  a percentage of the full input data set of which the determined amount of data comprises.

10. A computing device comprising processing circuitry and memory circuitry, wherein the computing device is configured to import an amount of data of a full input data set that is a portion of the full input data set, wherein the full input data set comprises a plurality of data records representing a dimensionally-modeled fact collection and each record comprises a plurality of characteristics of an entity, wherein the portion of the full input data set to import has been determined by:
  determining an amount of the data of the full input set to import based on an amount of available memory accessible to the one or more computing devices;
  based on the determined amount of the data to import and on characteristics of the full input data set other than the total size of the full input data set, determining sampling characteristics for sampling the full input data set,
  wherein the determined sampling characteristics are determined in part based on an indication of how many of the records have one or more particular values for one or more particular entity characteristics such that if a determined statistical significance achievable using the determined sampling characteristics does not meet a user-provided desired statistical significance for records with the particular values for the particular entity characteristics, the determined sampling characteristics are adjusted to meet the user-provided desired statistical significance for such records; and sampling the full input data set, to determine the portion of the records to import, in accordance with the determined sampling characteristics, wherein the adjusted sampling characteristics are such that analysis as a result of processing by the executing application of the sampled portion of the full input data set is representative of the analysis that could otherwise be carried out on the full input data set, with a calculable statistical relevance, wherein sampling the full input data set using the adjusted sampling characteristics is performed in a deterministic manner such that records of the full input data set having the particular values for the particular entity characteristics are included in the sampled portion of the full input data set in an amount sufficient to meet the user-provided desired statistical significance for such records, and wherein sampling the full input data set to determine the portion of the records to import includes applying a hash algorithm for sampling based on a key that is the value for each record at a particular dimension, the dimension in question being one that identifies a particular entity or user, wherein remaining information in each data record includes information regarding behavior or traits of the particular entity or user identified by the key for that record.

11. The computing device of claim 10, wherein:
the computing device is further configured to process the portion of the full input data set.

12. The computing device of claim 10, wherein:
the computing device is further configured to cause a representation of the portion of the full input data set to be displayed.

13. A computer program product comprising at least one computer-readable storage medium having computer program instructions stored therein which are operable to cause at least one computing device to:
  import a portion of a full input data set into memory accessible by one or more computing devices for processing by an executing application, wherein the full input data set comprises a plurality of data records representing a dimensionally-modeled fact collection and wherein each record comprises a plurality of characteristics of an entity, the importing of the portion of the full input data set comprising:
  determine an amount of the data of the full input set to import based on an amount of available memory accessible to the one or more computing devices;
  based on the determined amount of the data to import and on characteristics of the full input data set other than the total size of the full input data set, determine sampling characteristics for sampling the full input data set,
  wherein the determined sampling characteristics are determined in part based on an indication of how many of the records have one or more particular values for one or more particular entity characteristics such that if a determined statistical significance achievable using the determined sampling characteristics does not meet a user-provided desired statistical significance for records with the particular values for the particular entity characteristics, the determined sampling characteristics are adjusted to meet the user-provided desired statistical significance for such records; and cause the portion of the full input data set to be imported into the memory of the computer system, including sampling the full input data set, to determine the portion of the full input data set to import, in accordance with the determined sampling characteristics, wherein the adjusted sampling characteristics are such that analysis as a result of processing by the executing application of the sampled portion of the full input data set is representative of the analysis that could otherwise be carried out on the full input data set, with a calculable statistical relevance, wherein the computer program instructions operable to cause the at least one computing device to sample the full input data set to determine the portion of the full input data set to import includes computer program instructions operable to cause the at least one computing device to sample the full input data set in a deterministic manner such that records of the full input data set having the particular values for the particular entity characteristics are included in the sampled portion of the full input data set in an amount sufficient to meet the user-provided desired statistical significance for such records, and wherein sampling the full input data set to determine the portion of the records to import includes applying a hash algorithm for sampling based on a key that is the value for each record at a particular dimension, the dimension in question being one that identifies a particular entity or user, wherein remaining information in each data record includes information regarding behavior or traits of the particular entity or user identified by the key for that record.

14. The computer program product of claim 13, wherein:

the computer program instructions operable to cause the at least one computing device to sample the full input data set, to determine the portion of the records to import includes computer program instructions operable to sample such that, for each record of the full input data set sampled, wherein that input record has information about a particular user, every record of the full input data set including information regarding behavior of the particular user is sampled.

15. The computer program product of claim 14, wherein the computer program instructions further include computer program instructions operable to cause the at least one computing device to:

analyze the sampled data records, including determining a statistical confidence for the analysis; and cause a result of the analysis, including the determined statistical confidence, to be made available to a user.

16. The computer program product of claim 13, wherein the computer program instructions operable to cause the at least one computing device to determine an amount of the data of the full input set to import based on an amount of available memory of the computer system includes computer program instructions operable to cause the at least one computing device to:

determine the amount of the data to be less than the amount of available memory of the computer system.

17. The computer program product of claim 13, wherein the computer program instructions operable to cause the at least one computing device to sample the full input data set, to determine the portion of the records to import includes computer program instructions operable to cause the at least one computing device to:

assign the full input data set into a plurality of bins, wherein for each record of the full input data set sampled, that input record has a particular value at a particular dimension and every record of the full input data set having the particular value at the particular dimension is in that same bin; and sample all the records of at least one of the bins.

* * * * *